United States Patent [19]

Smith et al.

[11] Patent Number: 5,467,770
[45] Date of Patent: Nov. 21, 1995

[54] COLOR ADAPTIVE FRAME AVERAGING

[75] Inventors: James A. Smith, Pewaukee; Matthew Ellis, Waukesha; Rowland F. Saunders, Hartland; Anne L. Hall, New Berlin, all of Wis.

[73] Assignee: General Electric Company, Milwaukee, Wis.

[21] Appl. No.: 344,923

[22] Filed: Nov. 25, 1994

[51] Int. Cl.[6] ........................................ A61B 8/00
[52] U.S. Cl. ........................................ 128/661.08
[58] Field of Search .................... 128/661.07, 661.08, 128/661.09, 661.10; 73/861.25; 364/413.25

[56] References Cited

U.S. PATENT DOCUMENTS

| | | | |
|---|---|---|---|
| 5,111,825 | 5/1992 | Nishiyama et al. | 128/661.09 |
| 5,215,094 | 6/1993 | Franklin et al. | 128/661.08 |
| 5,357,580 | 10/1994 | Forestieri et al. | 364/413.25 |

Primary Examiner—George Manuel
Attorney, Agent, or Firm—B. Joan Haushalter; John H. Pilarski

[57] ABSTRACT

A color adaptive frame averaging method for an ultrasound imaging system adds persistence to images. The color adaptive frame averaging is achieved by computing filter weighting coefficients and using the filter weighting coefficients to compensate for aliased color data. Frame rate compensation is achieved by adjusting the filter weighting coefficients. In accordance with the present invention, the color adaptive frame averaging method comprises a filter, such as an infinite impulse response filter.

8 Claims, 1 Drawing Sheet

COLOR ADAPTIVE FRAME AVERAGING

TECHNICAL FIELD

The present invention relates to ultrasound imaging and, more particularly, to frame averaging data color doppler image data for an ultrasound imaging system.

BACKGROUND ART

Ultrasound imaging systems generate ultrasonic echoes from deliberately launched diagnostic sound waves into tissue. The ultrasonic echoes are attenuated in proportion to the distance that the sound waves must travel to reach the reflector, plus the distance that the resulting echoes must travel back to reach the receiver. The ultrasounds are displayed on a screen, providing medical information for the operator.

Frame averaging data has often been used to add persistence to images. Usually this is done on unsigned data. However, when frame averaging color doppler image data, it is necessary to consider the aliasing of the color frequency estimates. Aliased color data may change sign from one frame to the next, thus the algorithm needs to detect this and adapt by using a different weighting scheme. In addition, the acoustic frame rate of color data can have a wide range, making the persistence from the frame averaging look lighter or heavier.

It would be desirable then to have a method for color adaptive frame averaging for ultrasound imaging systems which overcomes the problems associated with the prior art.

SUMMARY OF THE INVENTION

The present invention provides a frame averaging method using adaptive weighting to compensate for aliased color data, as well as compensating for frame rate.

In accordance with one aspect of the present invention, a color adaptive frame averaging method for an ultrasound imaging system adds persistence to images. The color adaptive frame averaging is achieved by computing filter weighting coefficients and using the filter weighting coefficients to compensate for aliased color data. Frame rate compensation is achieved by adjusting the filter weighting coefficients. In accordance with the present invention, the color adaptive frame averaging method comprises a filter, such as an infinite impulse response filter.

Accordingly, it is an object of the present invention to provide a frame averaging method. It is another object of the present invention to provide such a frame averaging method suitable for frame averaging color doppler image data. It is a further object of the present invention to compensate for both aliased color data and frame rate.

Other objects and advantages of the invention will be apparent from the following description, the accompanying drawings and the appended claims.

DETAILED DESCRIPTION OF THE PREFERRED EMBODIMENTS

Figure 1:
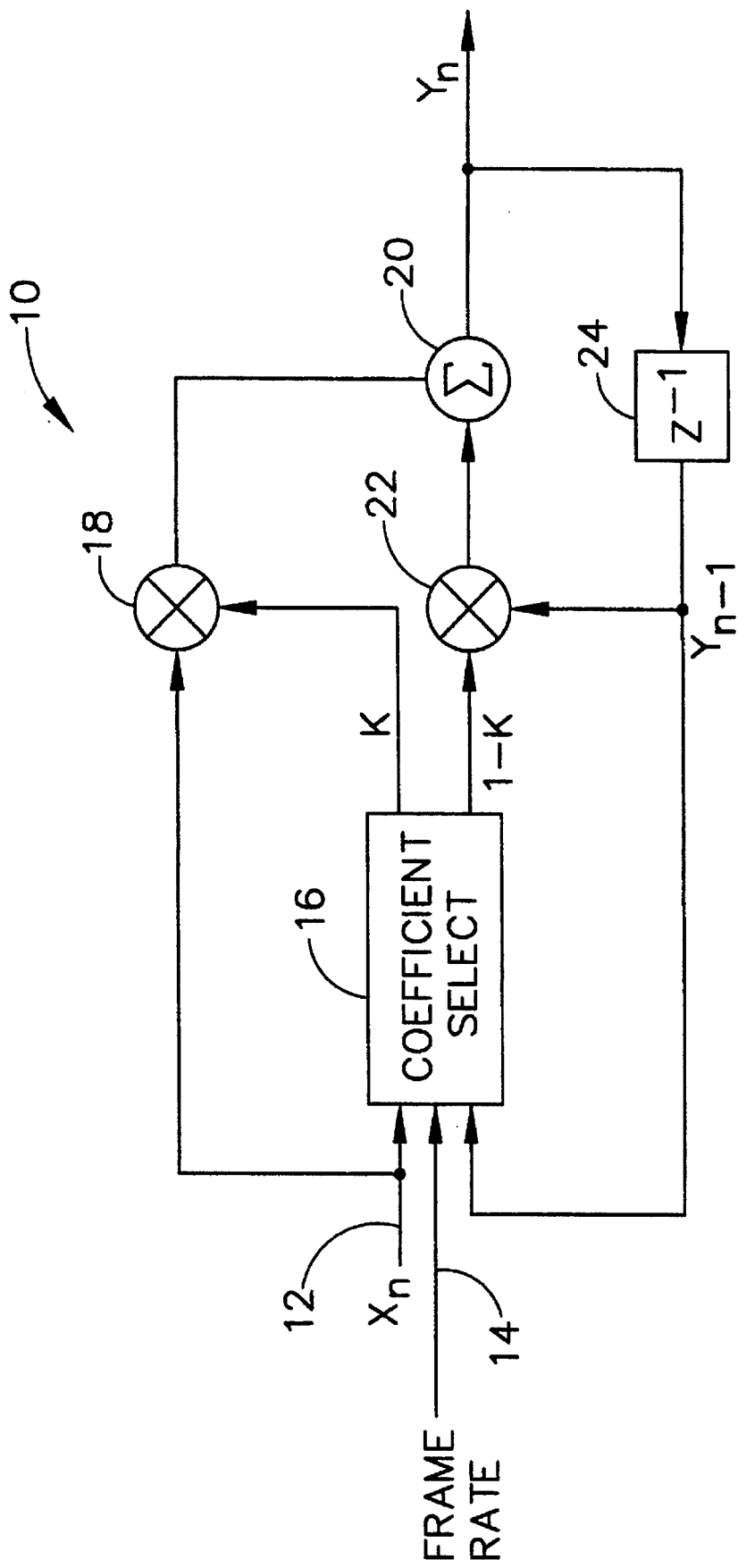
FIG. 1 illustrates a frame averaging filter according to the present invention.

The frame averaging method according to the present invention uses adaptive weighting to compensate for aliased color data as well as to compensate for frame rate. Frame rate compensation is achieved by changing the filter weighting coefficients based on frame rate. In general, a higher frame rate will result in heavier filter weights. The frame averaging method of the present invention comprises a filter, making the method suitable for averaging color Doppler image data.

The frame averaging method according to the present invention uses a different algorithm for increasing and decreasing flow velocity. Decreasing velocity flow is weighted so that it appears to decrease slowly, while increasing velocity flow is weighted so that the higher flow is displayed quickly. Increasing flow is weighted so that new data, representative of higher flow, is displayed on the screen for the operator, faster than lower flow data.

The color Doppler processing in ultrasound is measuring blood flow velocity using the Doppler shift. Since practical limits exist regarding how quickly data can be transmitted and received, faster blood flow can be aliased, or appear as a lower flow velocity than it really is. Since velocity is being measured as a signed value, i.e., "+" is towards the transducer and "−" is away from the transducer, aliased flow usually appears to change sign from one frame to the next. The color adaptive frame averaging technique of the present invention makes the assumption that if data changes sign between frames, the flow was aliased, and filter weighting is adjusted to display the new data value rather that using persistence. In accordance with the present invention, then, aliased flow is detected by using the difference between old and new data, and the new data is immediately displayed.

The frame averaging method of the present also detects when color data has aliased from frame to frame, and adapts the frame rate accordingly. Filter coefficients are computed adaptively based on velocity of the data. Since color Doppler is measuring the velocity of blood flow and displaying this as a color on the screen, a red color typically indicates velocity measured towards the transducer and a blue display typically indicates velocity measured away from the transducer. Also, the brighter the color, the faster the velocity, in general. The filter weighting is adjusted based on velocity to display lower velocities longer than higher velocities, to help the clinician better visualize the dynamics of flow. Consequently, filter coefficients are compensated in accordance with changes in acoustic frame rate.

FIG. 1 illustrates the general form of the frame average filter 10 according to the present invention, which, in a preferred embodiment, is implemented as an adaptive Infinite Impulse Response (IIR) filter 10. Filter weighting coefficients K are computed as a function of the current color velocity input ($X_n$) along line 12, the previous output ($Y_{n-1}$), and the acoustic frame rate, along line 14. The current color velocity input $X_n$, the frame rate, and the previous output $Y_{n-1}$ are provided to a coefficient select block 16. Since the filter 10 is dependent on the inputs to the coefficient select block 16, the outputs of block 16 are the coefficients used to adjust filter weighting. Filter weighting coefficient K and current color velocity input $X_n$ are multiplied at multiplier 18. The result from multiplier 18 is summed with the result of 1−K multiplied by the previous output, at multiplier 22. The result of summer 20 is the current output $Y_n$. A delay block 24 with the value $Z_{-1}$ is implemented to allow the output of the previous frame to be used, by inserting a one frame delay.

The coefficient computation can be pre-computed and implemented in a look-up table. The input data ($X_n$) to the filter 10 is signed velocity data from the color processor. It can be either scan converted image data, or acoustic line data (non scan converted).

The implementation of the filter 10 is shown in Equations 1 and 2, below. In Equation 1, the coefficient, k, is a non-linear function of the three inputs ($X_n$, $Y_{n-1}$ and Frame Rate). In Equation 2, the filter output is a first order IIR filter 10.

$$K = f(X_n, Y_{n-1}, \text{Frame Rate}) \qquad (1)$$

$$Y_n = KX_n + (1-K)Y_{n-1} \qquad (2)$$

The invention has been described in detail with particular reference to certain preferred embodiments thereof, but it will be understood that modifications and variations can be effected within the spirit and scope of the invention.

What is claimed is:

1. A color adaptive frame averaging method for an ultrasound imaging system comprising the steps of:
   computing filter weighting coefficients;
   using the filter weighting coefficients to compensate for aliased color data;
   achieving frame rate compensation by adjusting the filter weighting coefficients.

2. A color adaptive frame averaging method as claimed in claim 1 wherein the color adaptive frame averaging method comprises a filter.

3. A color adaptive frame averaging method as claimed in claim 2 wherein the filter comprises an infinite impulse response filter.

4. A color adaptive frame averaging method as claimed in claim 3 wherein an output of the filter comprises a first order infinite impulse response filter.

5. A color adaptive frame averaging method as claimed in claim 2 wherein the filter comprises a filter weighting coefficient.

6. A color adaptive frame averaging method as claimed in claim 5 wherein the filter weighting coefficient comprises a non-linear function of a plurality of inputs.

7. A color adaptive frame averaging method as claimed in claim 4 wherein the plurality of inputs comprises frame rate, velocity, and previous output.

8. A color adaptive frame averaging method as claimed in claim 2 wherein the filter comprises a delay function.

* * * * *